United States Patent
Fischer et al.

(10) Patent No.: US 9,215,150 B2
(45) Date of Patent: Dec. 15, 2015

(54) FEATURE SET NEGOTIATION FRAMEWORK

(71) Applicants: Martin Fischer, Heidelberg (DE); Olaf Schmidt, Walldorf (DE)

(72) Inventors: Martin Fischer, Heidelberg (DE); Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/927,426

(22) Filed: Jun. 26, 2013

(65) Prior Publication Data
US 2015/0006690 A1 Jan. 1, 2015

(51) Int. Cl.
*H04L 12/24* (2006.01)

(52) U.S. Cl.
CPC .................................. *H04L 41/5058* (2013.01)

(58) Field of Classification Search
CPC ............... H04L 41/0213; H04L 29/08144; H04L 29/08081; H04L 67/16; H04L 69/329; H04L 67/02; H04L 67/10; G06F 9/465; G04F 9/5072
USPC .................................. 709/202, 203, 223, 226
See application file for complete search history.

(56) References Cited

U.S. PATENT DOCUMENTS

| | | | |
|---|---|---|---|
| 7,171,471 B1 * | 1/2007 | Nair .............................. | 709/226 |
| 7,206,848 B1 * | 4/2007 | Zara et al. ..................... | 709/229 |
| 7,953,102 B2 | 5/2011 | Fritsch et al. | |
| 8,316,139 B2 | 11/2012 | Klimentiev et al. | |
| 8,346,895 B2 | 1/2013 | Cherdron | |
| 8,392,608 B1 | 3/2013 | Miller et al. | |
| 8,549,066 B1 * | 10/2013 | Donahue et al. .............. | 709/203 |
| 2001/0042122 A1 * | 11/2001 | Pierre Cote et al. .......... | 709/224 |
| 2002/0083166 A1 * | 6/2002 | Dugan et al. .................. | 709/223 |
| 2003/0051021 A1 | 3/2003 | Hirschfeld et al. | |
| 2003/0236883 A1 * | 12/2003 | Takeshima et al. ........... | 709/225 |
| 2007/0251998 A1 * | 11/2007 | Belenki ......................... | 235/380 |
| 2008/0288624 A1 * | 11/2008 | Armangil ...................... | 709/223 |
| 2010/0027552 A1 | 2/2010 | Hill | |
| 2011/0154231 A1 * | 6/2011 | Cherdron et al. ............. | 715/764 |
| 2012/0110129 A1 * | 5/2012 | Ronco et al. .................. | 709/219 |
| 2012/0254431 A1 | 10/2012 | Kylau et al. | |
| 2012/0281706 A1 | 11/2012 | Agarwal et al. | |
| 2012/0324069 A1 | 12/2012 | Nori et al. | |
| 2013/0036213 A1 | 2/2013 | Hasan et al. | |
| 2013/0074064 A1 * | 3/2013 | Das et al. ......................... | 718/1 |
| 2013/0104100 A1 | 4/2013 | Mueller | |
| 2013/0132144 A1 | 5/2013 | Kruempelmann et al. | |
| 2013/0227422 A1 | 8/2013 | Lehmann et al. | |
| 2014/0149400 A1 * | 5/2014 | Fu et al. ........................ | 707/723 |

OTHER PUBLICATIONS

Amazon Web Services, Amazon SimpleDB Getting Started Guide API Version Apr. 15, 2009, Mar. 4, 2014, Amazon, 22 pages.*

(Continued)

*Primary Examiner* — Wing F Chan
*Assistant Examiner* — Leon Y Tseng
(74) *Attorney, Agent, or Firm* — Schwegman Lundberg & Woessner, P.A.

(57) ABSTRACT

Disclosed in some examples are systems, methods, and machine readable mediums which provide a framework for client discovery of server features. In some examples, the client (e.g., the cloud service) may send a service request that requests data from the server (e.g., data source) processed according to one or more desired features from the server. The response from the data source may include feature indicators, which may indicate whether various features are supported at the data source.

18 Claims, 7 Drawing Sheets

(56) References Cited

OTHER PUBLICATIONS

Martynov, Query 101: Building Amazon SimpleDB Queries, Mar. 23, 2010, Amazon, 8 pages.* vFabric Documentation Center, How Function Execution Works, VMware, 4 pages.*

VMware, vFabric GemFire 6.6.X Release Notes, VMware, Nov. 4, 2011, 15 pages.*

Narten et al., RFC 4861 (Section 4.2), Sep. 2007, Internet Engineering Task Force, 4 pages.*

"Best Practices for Leveraging the Cloud-based Version of SAP", © ?SAP AG, (2013), 42 pgs.

* cited by examiner

FEATURE SET NEGOTIATION FRAMEWORK

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright SAP AG, All Rights Reserved.

BACKGROUND

Cloud computing is the use of computing resources available in a remote location and accessible over a network (e.g., the Internet). Cloud services may be a function, task, or accommodation provided by the cloud computing resources to users of those cloud computing resources. Example cloud services may include email (e.g., an Internet Message Access Protocol (IMAP) service), storage, communications, workflow management, customer relationship management (CRM), or the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In some examples, cloud computing resources may use backend data stores in the course of providing the cloud services to end users. For example, a computing resource providing a cloud-based customer-relationship management (CRM) functionality may use customer data stored in a first data store and sales data located in a second data store, where both data stores are on different computer systems from the computer system providing the CRM functionality.

Figure 1:
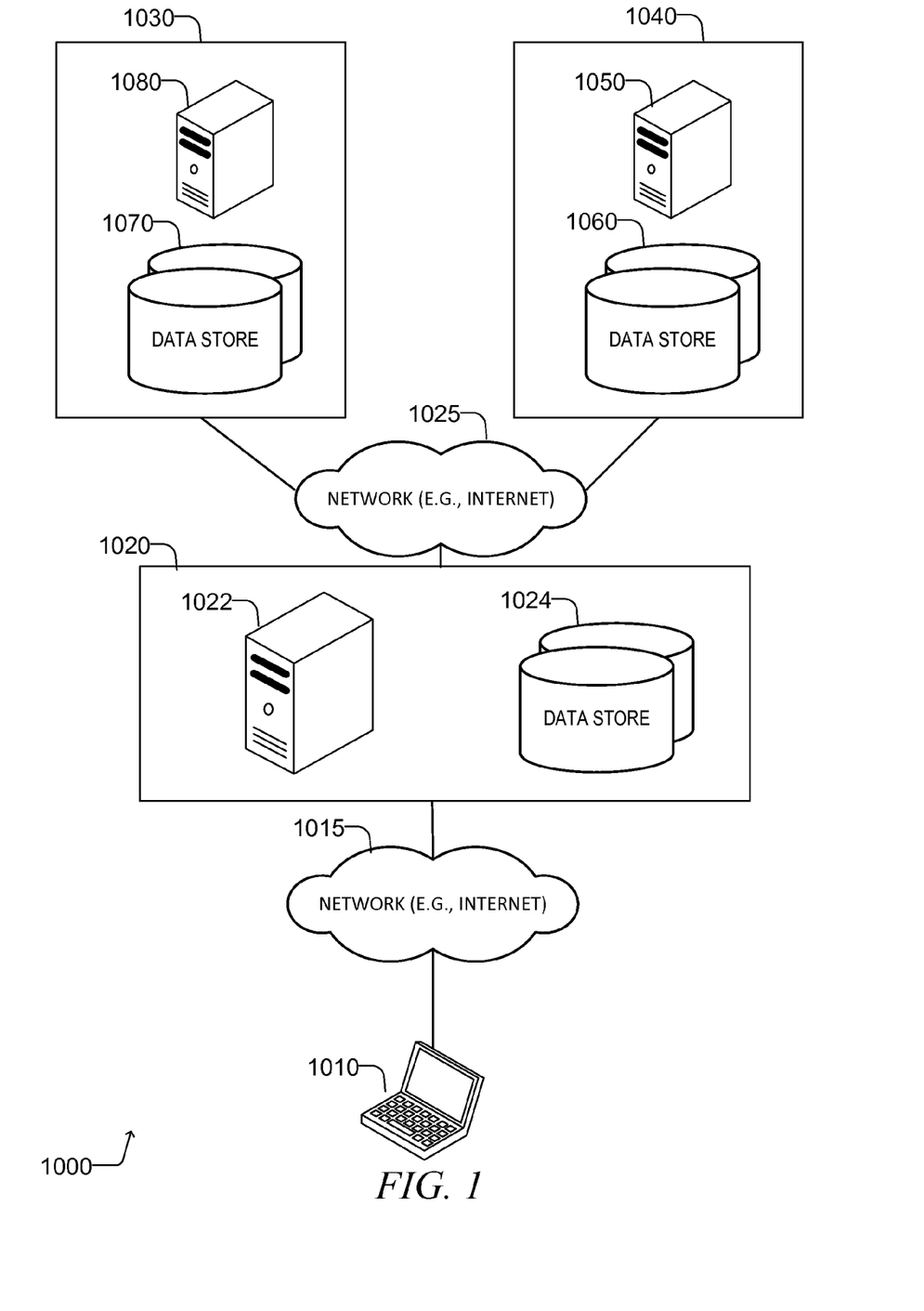
FIG. 1 is a block diagram of a system according to some examples of the present disclosure.

FIG. 1 shows an example of such a cloud-based system 1000. A user of a network-based application such as cloud computing services may utilize computing device 1010 to contact a cloud service 1020 over network 1015. Computing device 1010 may be any device capable of communicating with cloud service 1020 over network 1015 and capable of assisting the cloud service 1020 in providing the cloud service to the user (e.g., displaying a web-based user interface received from the cloud service 1020 and accepting user interaction with the interface and processing the user interaction accordingly). Example computing devices 1010 may include a personal computer (PC), a laptop, a tablet, a smartphone, a cellular telephone, a server computer, or the like. Network 1015 may be or include parts of the Internet, a Wide Area Network (WAN), a Local Area Network (LAN), a cellular network, or the like.

Cloud service 1020 may provide one or more cloud services to one or more computing devices 1010 through network 1015. Cloud service 1020 may include one or more computing devices 1022. Computing devices 1022 may be any computing device capable of providing the cloud services to computing devices 1010. For example, computing devices 1022 may include a PC, a laptop, a tablet, a smartphone, a cellular telephone, a server computer, or the like. Computing devices 1022 may utilize one or more data stores 1024 for providing the cloud services to the computing device 1010.

Computing devices 1022 may also contact through network 1025 other data sources such as data sources 1030 and 1040. Network 1025 may be or include parts of the Internet, a WAN, a LAN, a cellular network, or the like. Network 1025 may be or include the same or similar parts as network 1015.

Data sources 1030 and 1040 may include one or more data stores 1060, 1070 which may store data that may be relevant to the cloud service 1020. Computing devices 1050 and 1080 may receive requests for data from the cloud service 1020 and respond with data stored in data stores 1060, 1070. Computing devices 1050 and 1080 may be any computing device capable of communicating data to cloud service 1020 and accessing data stores 1060 and 1070. For example, computing devices 1050 and 1080 may include a PC, a laptop, a tablet, a smartphone, a cellular telephone, a server computer, or the like.

Data stores 1060, 1070, and 1024 may be any data storage equipment and may be or include a storage area network (SAN), a network-attached storage (NAS), a hard drive, solid state memory, or the like. The data stores 1060, 1070, and 1024 may include one or more databases.

Cloud services 1020 may contact data sources 1030 and 1040 for data related to the cloud services 1020 using a predefined communication protocol. For example, the cloud services 1020 may utilize a Hyper Text Transfer Protocol (HTTP) following a Representational State Transfer (REST) model. In these examples, the cloud services 1020 may request resources of data sources 1030 and 1040 using HTTP methods (e.g., GET) specifying the requested data using a particular Uniform Resource Identifier (URI) such as a Uniform Resource Locator (URL) or Uniform Resource Name (URN). In some examples, the cloud services 1020 may be able to pass parameters as part of the request. For example, a cloud-based service which provides a user interface displaying a visualization of a list of business objects may contact the data sources to retrieve the business objects for visualization. The cloud service may pass parameters as part of the message, or as a URL parameter. For example, an "$orderby" URL parameter may specify a particular ordering feature (e.g., $orderby=field1 desc, field 2 desc.). This parameter tells the data sources to return a list of business objects sorted by field 1 and field 2 in descending order.

As capabilities are added to the cloud service and to the data sources, some capabilities may not be immediately supported by both the cloud services and the data sources. For example, data source 1030 may be updated to include a new feature whereby the data is sorted by category, but data source 1040 was not updated with this new feature. Cloud service 1020 may also be updated to request the data sorted in this way. If cloud service 1020 were to request the data sorted according to this new feature from data source 1040, data source 1040 may return an error, or worse, it may crash. Cloud service 1020 may or may not handle the error properly and may not be able to recover.

Disclosed in some examples are systems, methods, and machine readable mediums which provide a framework for client discovery of server features. In some examples, the client (e.g., the cloud service) may send a service request that requests data from the server (e.g., data source) processed according to one or more desired features from the server. The response from the data source may include feature indicators, which may indicate whether various features are supported at the data source. In some examples, if the desired features are supported, the data source may provide the requested data processed according to the desired features along with the indications of feature support. If the desired features are not supported, the data source may provide the requested data unmodified along with the indications of feature support. In other examples, the data source may provide an error message when the data cannot be found, and the error message may provide the feature indicators. Upon receiving this response, the client may then determine, based upon the feature indicators, whether or not any returned data was processed in the desired manner or if additional processing is necessary. In other examples, the client and the server may negotiate the supported features prior to any data requests. These feature negotiation mechanisms may ensure that while the data sources and the cloud service may each support different features as a result of having different software releases, they may still be compatible with each other. For example, prior to sending a request for data, the client may request the list of supported features from the server. The server may then respond with the feature indicators that indicate support for the various features.

Support for each feature may be indicated by the server in the response using a feature indicator. For example, support for a feature may be indicated using a feature indicator which is a single binary bit (e.g., a feature bit). A predetermined value (e.g., '1') indicates that the feature is supported and another different predetermined value indicates that the feature is not supported (e.g., a '0' would mean that the feature is not supported). The feature indicators for various features may be grouped together in the response. When the response is converted into binary for transmission, it may consist of a feature bitstream. In a simple example, if a feature indicator consists of a binary bit, multiple features will create a feature bitstream where each bit in the feature bitstream would represent the support status of one feature. More complicated indicators may require more than one bit per feature in the feature bitstream. While many of the examples discussed utilize binary bits, one of ordinary skill in the art with the benefit of Applicants' disclosure will appreciate that other data types may be used to indicate support of features (e.g., character strings, integers, floating points, or the like).

The feature bitstream sent in the response may be created by the server and parsed by the client in a number of ways. In some examples, the client and the server may share a predetermined structure (referred to herein for descriptive convenience as a feature bitstream structure). This structure specifies which portions of the stream correspond to feature indicators for respective features. Thus, for example, if a fourth bit is predetermined as the feature bit for a particular search feature, a server would either set the fourth bit to 1 if it supports the feature or to 0 if it does not, and a client parsing the feature bits would check to see the value of the fourth bit to determine the status of the support for the search feature. As new features are added, each side must incorporate the new feature bitstream structure in their code (regardless of whether the feature is supported). In some examples, features may be grouped in the structure based upon categories. For example, feature bits for search features may be grouped together based upon a search feature category. An example feature bitstream structure may be represented by a JavaScript Object Notation (JSON) object as:

```
feature_bitstream_structure {
    "sorting": "1";   // backend supports a feature of the category
                      // "sorting" - e.g., sorting by multiple fields
                      (bit 1=true)
    "other functionality": "101101010"; //some other category
    ....
}
```

As already noted, the client and server will have access to this structure. The server need only set the bits in the right positions according to the JSON object definition and send them to the client as part of the response. The client may then decode the feature indicators based upon this shared JSON definition. In some examples, this may be accomplished by making small changes to the server code and the client code to incorporate any new feature fields in the JSON object whenever a new feature is to be supported by the system (regardless of whether or not the feature is ultimately implemented). In other examples, to avoid any changes to the code, the server may have a predetermined feature bitstream (e.g., in a text file on the server, which may be manually updated by an administrator or other update software) that it reads from to send the response.

While the above examples describe a situation in which updates to the supported features include updates to a shared definition for the feature bitstream structure (and subsequent incorporation into the client and server code regardless of support for the features), in other examples, the feature bitstreams may be dynamically parsable. For example, any new features may be added at the end of the bitstream. Thus, a client or server that parses a received feature bitstream may determine that the absence of a feature indicator (e.g., the length of the feature bitstream is shorter than expected) indicates non-support for the remaining features that were not reported. For example, a current feature bit string is defined as: X X X X X. A new feature is added, and the feature bit is added as Y at the end of the feature bitstream. A client that receives a feature bitstream of X X X X X Y may know that Y corresponds to the new feature and may use it to determine if the feature is supported. However, if the client receives a feature bitstream of X X X X X, the client may assume that the feature corresponding to Y is not supported.

Dynamically parsable structures may also support categorization and other organizations of the feature bitstreams as well. For example, there may be labels or markers appended to each category so that a client parsing the feature bitstream may find feature bitstreams of feature categories by searching for the feature categories of interest (the remaining feature categories may be ignored). For example, from the previous JSON definition:

```
feature_bitstream_structure {
    "sorting": "1";      // backend supports a feature of the category
                         //"sorting" - e.g., sorting by multiple fields
                         (bit 1=true)
    "other functionality": "101101010"; //some other category
    ....
}
```

In the above example, the labels "sorting" and "other functionality" may be labels that allow a parser to quickly find the bitstream for that feature category. In some examples, each category may be terminated with a known stop bit sequence, which may be an otherwise invalid value, to allow a parser to know when the bitstream for a particular category ends.

With respect to the JSON feature bitstream structure shown in the above examples, each feature category features a bitstream indicating support for features within that category. This bitstream may correspond to a particular defined order within that category. In some examples, new features are added to the back (or front, depending on implementation). Thus, a parser may search for the category label of interest, read the feature bitstream of that category, and compare it to the known positions of features that it is aware of to determine feature support. If the bitstream is smaller than expected, (e.g., a feature is not reported as either supported or not), the client may assume it is not supported. For example, if the bitstream received for the "other functionality" category is expected to be 10 bits, but the received bitstream is 9 bits, the last bit signifies a non-supported function.

In still other examples, each feature bitstream structure may be versioned. When new features are added, a new version of the bitstream is created. The server then sends a version number for the feature bitstream structure utilized. Clients parsing the received bitstream may read the version number and then utilize the correct structure matching that version.

In some examples, the feature indicators may be included in a header of the response message from the data sources to the cloud services. For example, the feature indicators may be in a custom HTTP header field. In yet other examples, the feature indicators may be at the end of the payload of the response. In still other examples, the features may be included in a URL parameter. In some examples, the feature object may be designed as a JSON (JavaScript Object Notation) object.

Figure 2:
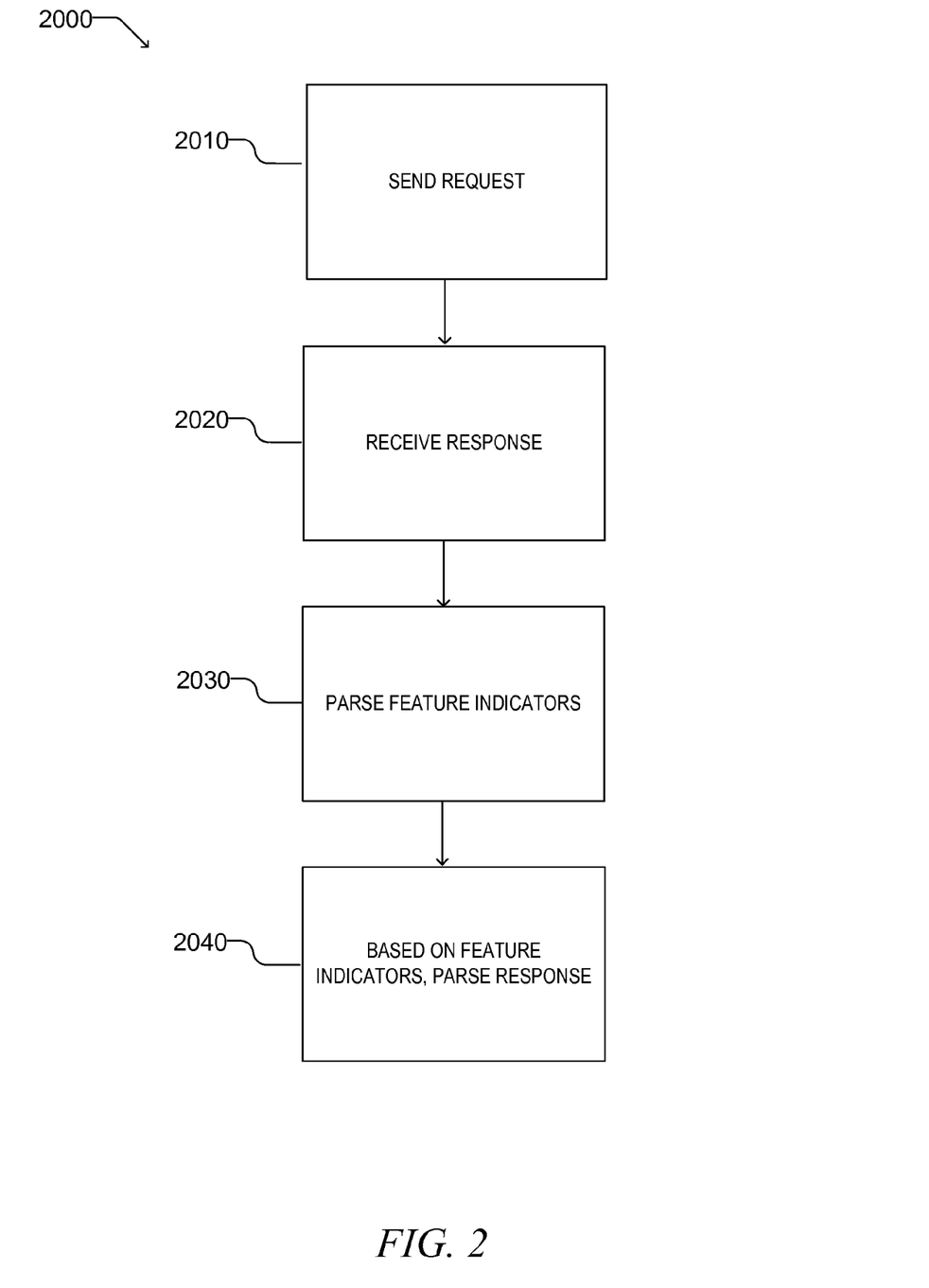
FIG. 2 is a flowchart of a method according to some examples of the present disclosure.

Turning now to FIG. 2, an example flowchart of a method 2000 of a client (e.g., cloud service) contacting a server (e.g., data source) according to some examples is shown. At operation 2010 the client sends a request to the server for data. The request may be based upon HTTP and may be addressed to a particular URI located on the server. The URI may depend on the current context of the client. A context may be the client's (e.g., cloud service's) current operating state with respect to a particular user. Example facets of this context include one or more of: the identity of the user, the privilege level of the user, the current function provided by the client to the user (e.g., a customer relations management function, a sales function, or the like), or the like. Changes to any one of these different facets may be a change of context and the same client (e.g., cloud service) may operate in different contexts during execution. For example, the client may provide different services which may each run in one or more different contexts.

Each different context may have a different request URI for the same data. The URI utilized may indicate the client's current context to the server. The server may process the request differently depending on the client's context. For example, some features may only be available for certain contexts, thus the feature indicators sent in the response may change depending on the signaled context. In other examples, data may be processed differently—e.g., sensitive data may be stripped out of contexts that are not authorized to view the data.

The client may request certain features to be performed on the requested data, or the requested URI itself may comprise a request for a feature. In some examples, the GET request may request particular data based upon the particular URI in the GET request. Requested features may be specified by the particular parameters of the HTTP message, including parts of the header of the message, custom fields of the message, and/or URL parameters.

At operation 2020, the client may receive a response to the request from the server. At operation 2030, the client may parse the response, including any feature indicators (e.g., in a feature bitstream) which may have been included by the server. As already noted, the feature indicators may be included in the header of the message, or in other examples, may be in a predetermined portion of the body of the message (e.g., at the end). The feature indicators may be part of a feature bitstream specifying feature indicators for one or more features.

Based on the feature indicators, at operation 2040, the client may parse the message. For example, if the requested feature is supported, the client can expect to parse the payload in a manner consistent with the feature being implemented. For example, if the client requested data sorted in a certain way, the client may assume that the data was so sorted. If the feature is not implemented, the client can take any number of actions. In some examples, if the feature is not supported but the data is capable of being sent without the feature being implemented (e.g., the feature operates on the data, but the data exists independently of the feature), the server may send the data without the features being applied to the data (e.g., the data is not sorted, filtered, or the like). In these examples, the client may contain code implementing the feature on the client side. Thus, for example, if the feature is a sort function, the client may take the payload data, which may be unsorted data, and sort the data itself. In other examples, the client may display an error to the user—for example, if the data itself cannot be sent without the feature being implemented, or the feature cannot be implemented on the client.

Figure 3:
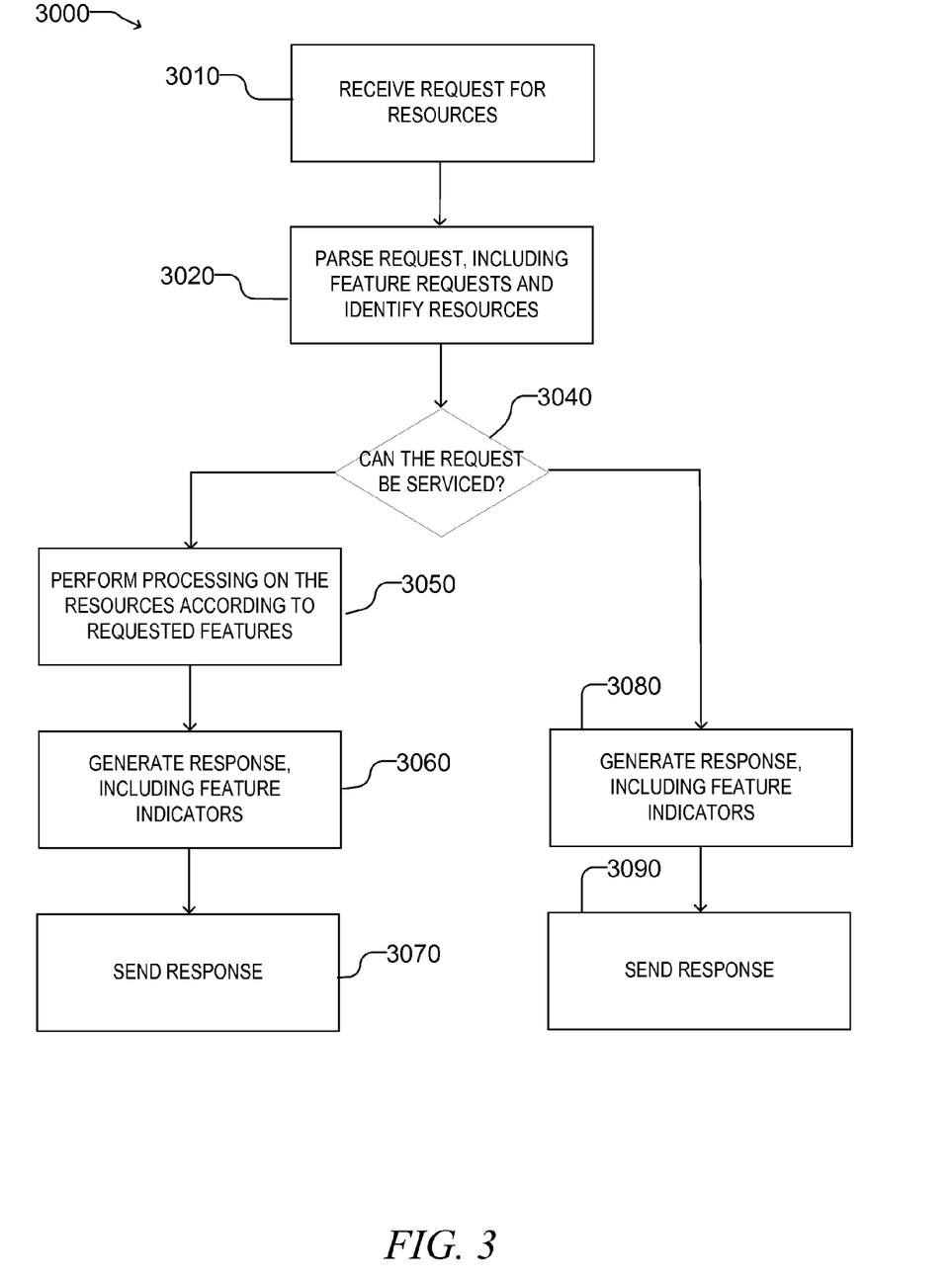
FIG. 3 is a flowchart of a method according to some examples of the present disclosure.

Turning now to FIG. 3, a flowchart of a method 3000 of operating a server, according to some examples of the present disclosure, is shown. At operation 3010, the server may receive a request for one or more resources. This request may be done using a HyperText Transfer Protocol (HTTP) or some other communication protocol. At operation 3020 the request may be parsed, feature requests may be identified, and requested resources located. For example, the URI may be extracted, which may specify one or more requested resources. The URI of the requested resource may convey information of the context of the client as already noted. Additionally, the request may be parsed to determine if any features were requested. For example, the request may include a URI identifying particular resources and one or more parameters specifying features that may relate to that data. Certain contexts may have one set of supported features, while other contexts may have a different (potentially overlapping) set of supported features. Parameters may be parameters of the HTTP message. One example feature may be a particular sorting algorithm with particular parameters. While in some examples, the URI may specify the data to return, in other examples, the URI may specify a requested feature. For example, the feature may produce the data that is to be returned to the client.

At operation 3040, the server may determine if the request can be serviced. For example, the URI referenced may refer to a resource that cannot be found or a feature that is not supported. In some examples, if the URI indicates a data resource that is found, but the feature is not supported (e.g., the particular sorting algorithm is not supported), the request may still be serviced by sending the data identified by the URI without the feature applied (e.g., the unsorted data). In some examples, as long as the data referenced by the URI is found, the server may respond with the data. In this case, if the feature is supported, the data may be processed according to the desired features. If the feature is not supported, the data may be sent without any processing. At operation 3080, if the request cannot be serviced, an appropriate response may be generated. For example, if the URI cannot be located (e.g., the referenced data does not exist or the feature referenced by the URI is not supported or does not exist), a 404 not found message may be generated. This error message may include feature indicators of one or more supported features. At operation 3090, the response may be sent to the client.

If the request is capable of being serviced, the server may perform the requested processing at operation 3050 according to the requested features. At operation 3060, the response may be generated, which may include data requested by the client. This data may or may not be modified by one or more requested features. In some examples, if the client requested a feature that is unavailable, but the request may still be processed (e.g., the data may be located and sent to the client in an unmodified form), the server may generate feature indicators (e.g., feature bits) which may describe the supported features of the server. In some examples, if the feature is available the feature indicators are not sent, but in other examples, even if the feature is available the feature indicators may be sent (which may describe other features). At operation 3070, the response may be returned to the client. In some examples, the feature indicators (if included) may be returned as part of the header of the response. The feature bitstream may be generated dynamically by consulting a table, list, or other indication of which features the server supports. In other examples, the feature bitstream may be predetermined when the software of the server is generated.

In some examples, if the client requests an unsupported feature, the unsupported feature request may be logged. This may give administrators of the server information on what unsupported features are being requested by clients, which may enable the administrators to determine when to update the software on the server. For example, the system may automatically notify an administrator when more than a predetermined threshold number of unsupported feature requests are received. In some examples, the system may automatically notify an administrator when more than a predetermined threshold number of different unsupported feature requests are received (e.g., it would count the number of unsupported features). In other examples, upon processing a request for an unsupported feature (or upon processing more than a predetermined number of requests for unsupported features), the server may automatically contact an update service. The update service may check to see if a more up to date version of the server software is available, and if it is, the server may automatically download and in some examples, automatically install the upgraded software.

Figure 4:
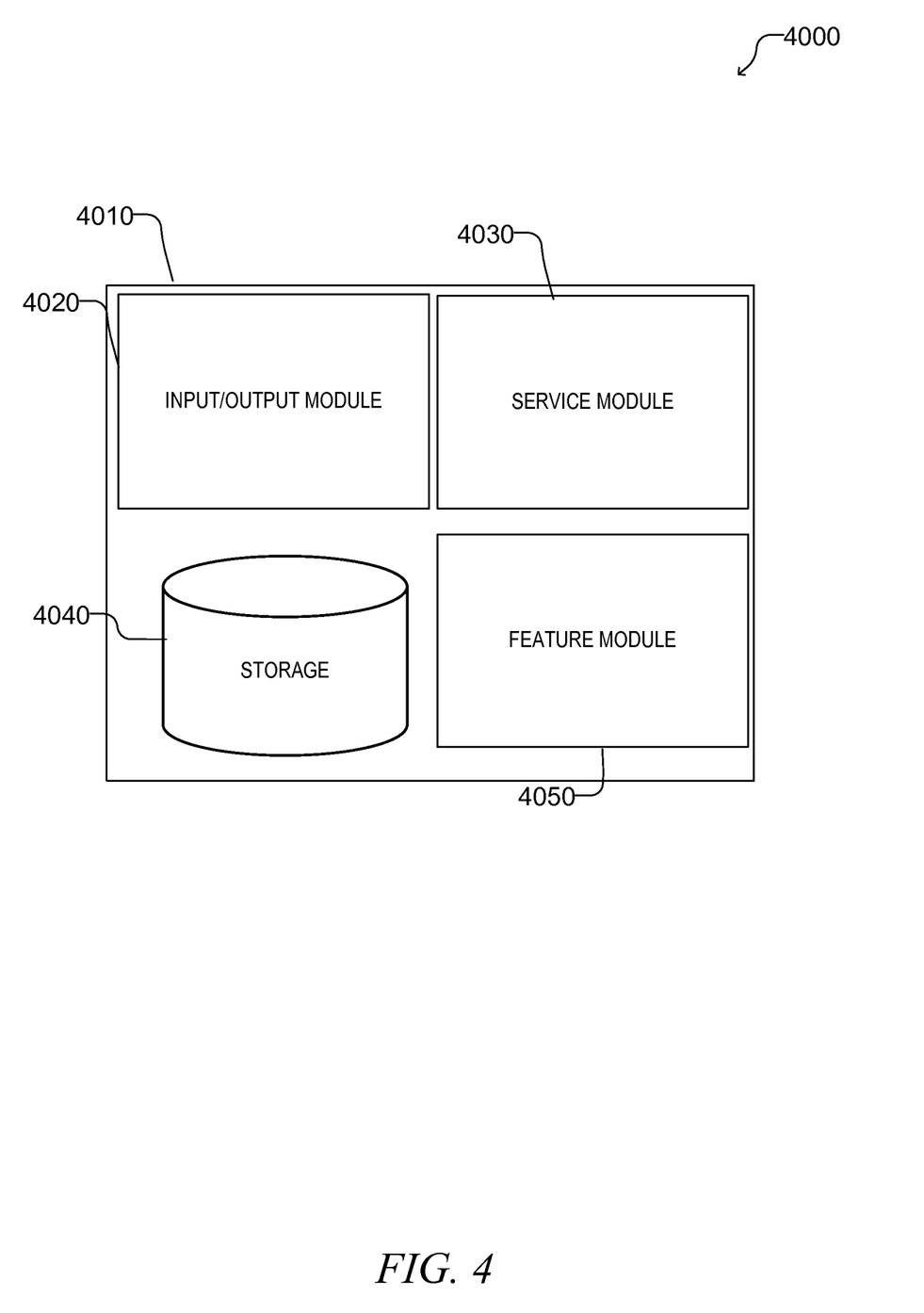
FIG. 4 is a block diagram of a client according to some examples of the present disclosure.

Turning now to FIG. 4, a schematic 4000 of a client (e.g., a cloud service), according to some examples of the present disclosure, is shown. Client 4010 may include an input and output module 4020 for receiving input from, and sending output to, the computing device of an end user and to a server (e.g., data source) over one or more networks. Client 4010 may include a service module 4030, which may provide one or more services to users. For example, service module 4030 may provide one or more cloud-based services to users. For example, the service module 4030 may provide a user interface for the manipulation of business objects. A business object may be a particular representation of data, may hold a set of attributes, and may contain associations with other business objects. These objects, taken together, may form a representation of business relationships.

The service module 4030 may utilize data from the server (e.g., data sources) to provide the cloud-based services to users. For example, the service module 4030 may provide an interactive graphical user interface, which is then sent to the user (e.g., as a web-page viewable in a browser, as a standalone application, or some combination). The service module 4030 may send requests to one or more data servers. As already noted, these requests may request data and may request one or more features to be performed on the data. The response may include feature indicators (e.g., feature bits) indicating supported features of the server—in some examples, in the form of a feature bitstream. The service module 4030 may intelligently adjust to an indication by the server that a particular feature requested is not available. For example, the service module 4030 may implement the feature by processing data in the same way that the server would process the data. In some examples, the service module 4030 may note the supported features for the next request by the client. Service module 4030 may communicate with the server and the service consumer over a network utilizing input and output module 4020.

Feature module 4050 may parse any server responses, parse the feature indicators received from the server, and store feature compatibility of one or more different servers in storage 4040. For example, the service module 4030 may pass the server response to the feature module 4050. The feature module 4050 may parse the response for the feature indicators, status codes, data, and other parameters. The feature module 4050 may also update the list of supported features of that particular server in the storage 4040.

Upon finding feature indicators, the feature module 4050 may compare the feature indicators sent by the server and the feature sent with the request to determine if the appropriate feature was performed. If the feature was not performed, the feature module 4050 may perform the requested feature. In some examples, the feature module 4050 may not support the requested feature, but may know a particular server that does support the requested feature. The feature module 4050 may then send the data along with a feature request to the server that supports the requested feature, asking that server to perform that feature on the data. For example, if the client requests customer data sorted by a name field from a first server, and that server does not support the name field sort, but instead just sends the raw data, the client may send the returned raw data from the first server to a second server that the client knows supports this feature. The second server may be setup to handle these special requests and may sort the sent data according to the particular feature.

Figure 5:
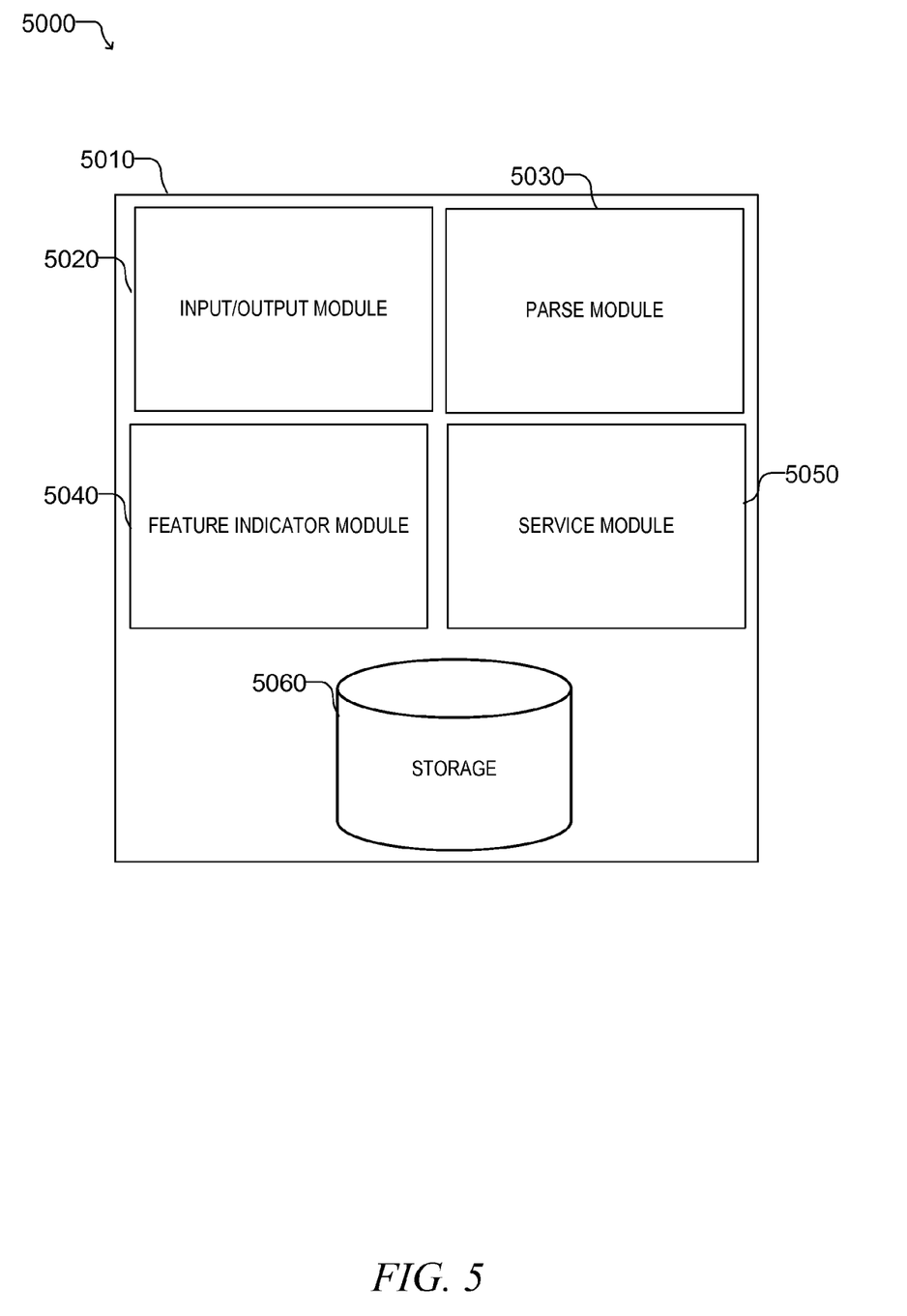
FIG. 5 is a block diagram of a server according to some examples of the present disclosure.

Turning now to FIG. 5, an example schematic diagram 5000 of a server 5010 according to some examples is shown. Input and output module 5020 may communicate with one or more client applications over one or more networks. The input and output module may receive a request from a client for a particular resource and may pass this request to the service module 5050. Service module 5050 may provide services in the form of responding to requests from clients. The service module 5050 may call the parse module 5030 to parse the request. The parse module 5030 may determine which parameters are present (e.g., which features are requested) and what resources, if any, are requested by examining the URI, the header of the message, the body of the message, and the like. This information may be passed back to the service module 5050. The service module 5050 may then determine if the service can be handled and may prepare an appropriate response. If the response is to include feature indicators, the service module 5050 may query the feature indicator module 5040 for the current feature indicators. Feature indicator module 5040 may provide the currently configured feature indicators (e.g., feature bits) for the particular server.

Storage 5060 may store data resources (e.g., data requested by clients). The data resources may be identified by any suitable identifier. For example, filename, URI, URL, or the like. Storage 5060 may also store the feature indicators for the server, or the list of supported features on the server and the global feature indicator structure (the feature indicators are dynamically generated), or a file with predetermined feature indicators (e.g., the feature indicator module just reads the predetermined feature indicators and those are sent without modification to the client in a response).

In some examples, the feature indicators sent as part of the response may include indicators regarding all features that the server is aware of, including feature bits for features that are not applicable to the original request. For example, if the original request was for the name of a particular business object, the response may include feature indicators related to features regarding business objects, but also feature indicators for features available to the client unrelated to business objects (for example, features relating to client user accounts). In some examples, the feature indicators returned may be indicators for a subset of all the features of the server. For example, the client may request a certain resource at a particular location which may indicate a context of the user and/or a context of the client application. A subset of the entire feature bitstream may be selected based upon this context. Thus for a human resources application context, the features may relate to employee files, but for a payroll application context, the features may relate to wages and earnings. The feature indicators returned for each different context may be specified by a predetermined list.

Figure 6A:
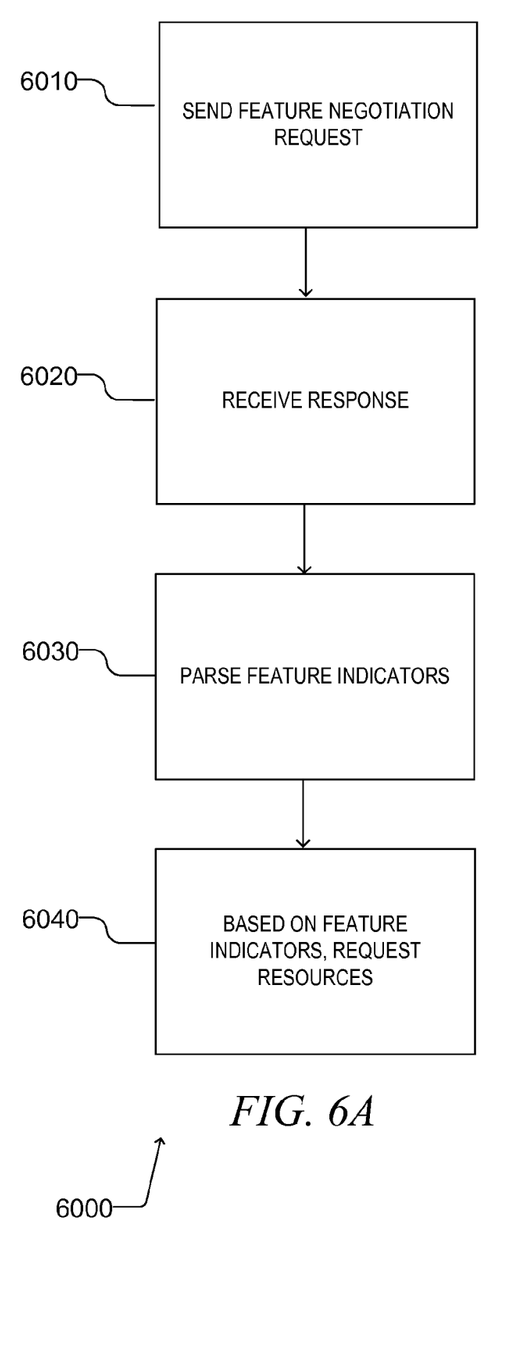
FIG. 6A is a flowchart of a method according to some examples of the present disclosure.
Figure 6B:
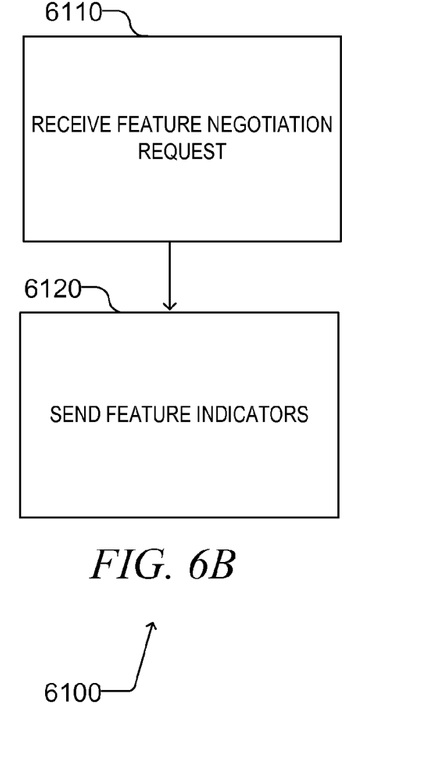
FIG. 6B is a flowchart of a method according to some examples of the present disclosure.

By utilizing the resource request messages to exchange feature information the method may eliminate additional messaging relating to feature discovery. However, in some embodiments, explicit feature discovery may be utilized. FIGS. 6A and 6B show flowcharts of another example method of the present disclosure utilizing feature discovery. FIG. 6A shows a flowchart of a method 6000 of feature discovery on the client side. At operation 6010, the client may send a feature negotiation request to the server. This request may be for all features, features related to a particular context, or features related to a particular data item. At operation 6020, the server responds with the feature indicators as described previously. At operation 6030, the feature indicators may be parsed, and at operation 6040, based on these feature indicators, the system may request one or more resources with one or more features. FIG. 6B shows an example server method 6100 of feature discovery on the server side. At operation 6110, the server may receive a feature negotiation request. At operation 6120, the server may send the client the requested feature indicators as already noted.

Applicants note that while the cloud service was referred to as the client, this usage refers to the relationship between the data source and the cloud service. The cloud service may act as a server to other components, and indeed may be considered a server with respect to the user computing device. Additionally, while a cloud service and a data source was given as examples, one of ordinary skill in the art with the benefit of Applicants' disclosure will realize that the feature discovery methods disclosed herein will be applicable to any particular instance in which two communicating entities may not support all features of the communications protocol.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing device can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
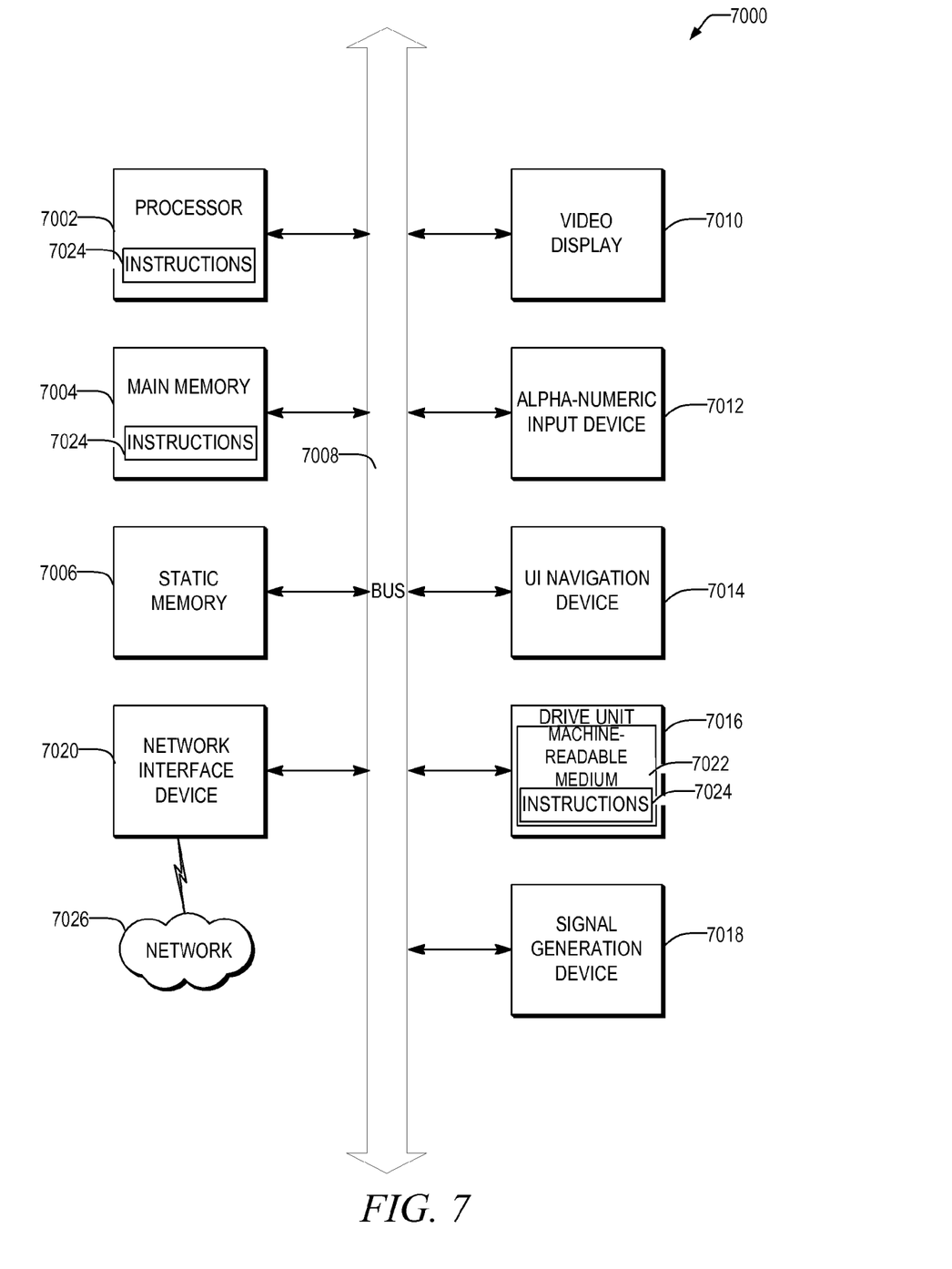
FIG. 7 is a block diagram of a machine according to some examples of the present disclosure.

FIG. 7 is a block diagram of a machine in the example form of a computing device 7000 within which instructions, for causing the machine to perform any one or more of the methodologies discussed herein, may be executed. For example, any one of the components shown in FIGS. 1, 4, and 5 may be or contain one or more of the components described in FIG. 7. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a Personal Digital Assistant, a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 7 or only a subset of the components shown in FIG. 7.

The example computing device 7000 includes a processor 7002 (e.g., a central processing unit (CPU), a graphics processing unit (GPU) or both), a main memory 7004 and a static memory 7006, which communicate with each other via a bus 7008. The computing device 7000 may further include a video display unit 7010 (e.g., a liquid crystal display (LCD) or a cathode ray tube (CRT)). The computing device 7000 may also include an alphanumeric input device 7012 (e.g., a keyboard), a user interface (UI) navigation device 7014 (e.g., a mouse), a disk drive unit 7016, a signal generation device 7018 (e.g., a speaker) and a network interface device 7020.

Machine-Readable Medium

The disk drive unit 7016 includes a machine-readable medium 7022 on which is stored one or more sets of instructions and data structures (e.g., software) 7024 embodying or used by any one or more of the methodologies or functions described herein. The instructions 7024 may also reside, completely or at least partially, within the main memory 7004, static memory 7006, and/or within the processor 7002 during execution thereof by the computing device 7000, the main memory 7004 and the processor 7002 also constituting machine-readable media.

While the machine-readable medium 7022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 7024 may further be transmitted or received over a communications network 7026 using a transmission medium. The instructions 7024 may be transmitted using the network interface device 7020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 7020 may wirelessly transmit data and may include an antenna.

Although the present disclosure has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   sending, from a first server in accordance with a command received by the first server from a computing device, a service request to a second server, the service request including a request for data and including a first set of feature indicators representative of a first set of features according to which the data is to be processed, the first set of features being specific to a user of the first server, the service request being sent to an address specific to the first set of feature indicators, the first set of features causing the second server to perform a modification of the data to generate modified data;
   receiving, at the first server, a response to the service request from the second server, the response including modified data processed by the second server according to the first set of features, at least a portion of unmodified data provided by the second server, and a second set of feature indicators, the second set of feature indicators being generated by the second server based on a second set of features supported by the second server and represented by the second set of feature indicators, wherein the first server is configured by a first version of a software and the second server is configured by a second version of the software;
   based on the second set of feature indicators in the response, determining from the received response that a feature indicator among the first set of feature indicators is excluded from the second set of feature indicators; and
   generating a notification indicative of the service request and the feature indicator determined to be excluded from the second set of feature indicators.

2. The method of claim 1, wherein sending the service request to the second server comprises sending the service request to a Universal Resource Identifier specific to the first set of feature indicators.

3. The method of claim 1, wherein based on determining that the feature indicator is excluded from the second set of features, executing the feature, represented by the feature indicator excluded from the second set of feature indicators, to generate the modified data.

4. The method of claim 1, wherein the second set of feature indicators are arranged according to a defined structure, the defined structure being a predetermined object structure.

5. The method of claim 1, wherein the first server includes a cloud service application.

6. The method of claim 1, wherein the first server stores the second set of feature indicators received from the second server along with a plurality of other feature indicators from respective plurality of other servers.

7. A system comprising:
a computing device comprising one or more computer processors configured to include:
a service module implemented by the one or more processors configured to provide a first server;
an input and output module configured to:
send, from the first server in accordance with a command received by the first server from a computing device, a service request to a second server, the service request including a request for data and including a first set of feature indicators representative of a first set of features according to which the data is to be processed, the first set of features being requested from the second server, the first set of features being specific to a user of the first server, the service request being sent to an address specific to the first set of feature indicators, the first set of features causing the second server to perform a modification of the data to generate modified data;
receive, at the first server, a response from the second server, the response including modified data processed by the second server according to the first set of features, at least a portion of unmodified data provided by the second server, and a second set of feature indicators, the second set of feature indicators being generated by the second server based on a second set of features supported by the second server and represented by a second set of feature indicators, wherein the first server is configured by a first version of a software and the second server is configured by a second version of the software; and
a feature module configured to:
based on the second set of feature indicators in the response, determining from the received response that a feature indicator among the first set of feature indicators is excluded from the second set of feature indicators; and
generate a notification indicative of the service request and the feature indicator determined to be excluded from the second set of feature indicators.

8. The system of claim 7, wherein the input and output module is configured to send the service request to the second server by at least sending the service request to a Universal Resource Identifier specific to first set of feature indicators.

9. The system of claim 7, wherein the feature module is configured to execute the feature, represented by the feature indicator excluded from the second set of feature indicators, to modify the data requested in the service request, based on determining that the feature indicator is excluded from the second set of features.

10. The system of claim 7, wherein the second set of feature indicators are arranged according to a defined structure, the defined structure being a predetermined object structure.

11. The system of claim 7, wherein the first server includes a cloud service application.

12. The system of claim 7, wherein the feature module is configured to store the second set of feature indicators received from the second server along with a plurality of other feature indicators from respective plurality of other servers.

13. A non-transitory machine readable storage medium that stores instructions which when performed by a machine, cause the machine to execute a network-based application, which causes the machine to perform operations comprising:
sending, from a first server in accordance with a command received by the first server from a computing device, a service request to a second server, the service request including a request for data and including a first set of feature indicators representative of a first set of features according to which the data is to be processed, the first set of features being specific to a user of the first server, the service request being sent to an address specific to the first set of feature indicators, the first set of features causing the second server to perform a modification of the data to generate modified data;
receiving, at the first server, a response from the second server, the response including modified data processed by the second server according to the first set of features, at least a portion of unmodified data provided by the second server, and a second set of feature indicators, the second set of feature indicators being generated by the second server based on a second set of features supported by the second server and represented by a second set of feature indicators, wherein the first server is configured by a first version of a software and the second server is configured by a second version of the software;
based on the second set of feature indicators in the response, determining that a feature indicator among the first set of feature indicators is excluded from the second set of feature indicators; and
generating a notification indicative of the service request and the feature indicator determined to be excluded from the second set of feature indicators.

14. The non-transitory machine-readable storage medium of claim 13, wherein the instructions for sending the service request to the second server include instructions, when performed by the machine, cause the machine to perform operations comprising: sending the service request to a Universal Resource Identifier specific to the first set of feature indicators.

15. The non-transitory machine-readable storage medium of claim 13, wherein the instructions for determining that the feature indicator is excluded from the second set of feature indicators, executing the feature, represented by the feature indicator excluded from the second set of feature indicators, to generate the modified data.

16. The non-transitory machine-readable storage medium of claim 13, wherein the second set of feature indicators is arranged according to a defined structure, the defined structure being a predetermined object structure.

17. The non-transitory machine-readable storage medium of claim 13, wherein the first server includes a cloud service application.

18. The non-transitory machine-readable storage medium of claim 13, wherein the instructions comprise instructions, which when performed by a machine, cause the machine to perform operations comprising: storing the second set of feature indicators received from the second server along with a plurality of other feature indicators from respective plurality of other servers.

* * * * *